(12) United States Patent
Paningipalli et al.

(10) Patent No.: US 9,804,855 B1
(45) Date of Patent: Oct. 31, 2017

(54) MODIFICATION OF TEMPORARY FILE SYSTEM FOR BOOTING ON TARGET HARDWARE

(71) Applicant: Veritas Technologies LLC, Mountain View, CA (US)

(72) Inventors: Venkat Thamesh Paningipalli, Secunderabad (IN); Narendra Katlamudi, West Godavari (IN)

(73) Assignee: Veritas Technologies LLC, Mountain View, CA (US)

( * ) Notice: Subject to any disclaimer, the term of this patent is extended or adjusted under 35 U.S.C. 154(b) by 201 days.

(21) Appl. No.: 14/878,821

(22) Filed: Oct. 8, 2015

(51) Int. Cl.
*G06F 9/445* (2006.01)
*G06F 9/44* (2006.01)

(52) U.S. Cl.
CPC .............. *G06F 9/4401* (2013.01); *G06F 8/64* (2013.01); *G06F 9/4406* (2013.01); *G06F 9/4411* (2013.01)

(58) Field of Classification Search
CPC . G06F 8/63; G06F 8/64; G06F 9/4411; G06F 11/1469
See application file for complete search history.

(56) References Cited

U.S. PATENT DOCUMENTS

| | | | |
|---|---|---|---|
| 7,293,272 B1 | 11/2007 | Okcu et al. | |
| 7,313,719 B1 | 12/2007 | Elahee | |
| 7,330,967 B1 | 2/2008 | Pujare et al. | |
| 7,334,157 B1 | 2/2008 | Graf et al. | |
| 7,565,517 B1 | 7/2009 | Arbon | |
| 7,769,990 B1 | 8/2010 | Okcu et al. | |
| 7,886,185 B1 | 2/2011 | Okcu et al. | |
| 8,103,747 B2 | 1/2012 | Trujillo | |
| 8,132,186 B1 | 3/2012 | Okcu et al. | |
| 9,032,394 B1* | 5/2015 | Shi | G06F 8/61 717/121 |
| 9,146,748 B1 | 9/2015 | Kumar | |
| 2012/0324280 A1* | 12/2012 | Wang | G06F 11/1417 714/15 |
| 2014/0372744 A1* | 12/2014 | Xu | H04L 61/2023 713/2 |

OTHER PUBLICATIONS

Okcu, Okan, U.S. Appl. No. 11/351,778, entitled "Detecting and Performing Dissimilar System Restore", filed Feb. 10, 2006, 35 pages.

* cited by examiner

*Primary Examiner* — Albert Wang
(74) *Attorney, Agent, or Firm* — Rory D. Rankin; Meyertons, Hood, Kivlin, Kowert & Goetzel, P.C.

(57) ABSTRACT

A system and method for efficiently restoring data to a different computing device. At least a backed up operating system (OS) and an initial file system, which is also referred to as a temporary file system, are restored on a memory connected to a target computing device. The OS and the initial file system are configured for a hardware configuration for a source computing device different from a hardware configuration for the target computing device. The input/output (I/O) modules used for accessing storage devices connected to data storage interfaces within the target computing device are identified and compared to I/O modules in the initial file system. The missing I/O modules in the initial file system for the target computing device are retrieved from the restored OS and inserted in the initial file system. Afterward, a boot up sequence is executed using the modified initial file system.

20 Claims, 11 Drawing Sheets

MODIFICATION OF TEMPORARY FILE SYSTEM FOR BOOTING ON TARGET HARDWARE

BACKGROUND OF THE INVENTION

Field of the Invention

This invention relates to the field of computer processing and, more particularly, to restoring data to a different computing device.

Description of the Related Art

As computer memory storage and data bandwidth increase, so does the amount and complexity of data that users daily manage in business, research, medicine, finance, at home and so on. The data may be generated, modified and stored on various types of a computing device, such as a desktop computer, a laptop, a server, a smartphone and so forth. The data on the computing device may include at least an operating system, applications executed by the user, and user data and user metadata provided to the applications and modified by the applications.

In addition to backing up user data, the user may want to back up a particular session or state of the entire software system of a source computing device including the operating system, applications, the user data and any other metadata used to restore the entire software system on a hardware system. The backed up data is capable of being restored on a target computing device which has no installed operating system. In fact, the target computing device may not have any installed software. This type of computing device with no installed software including no operating system may be referred to as a bare metal computing device.

Restoring backup data to a bare metal target computing device may be referred to as a bare metal restore or a bare metal recovery. A backup for the source computing device may be performed for security reasons, for later configuring a new bare metal target computing device to a known initial state based on a previous source computing device, or for other reasons. An initial file system, which may also be referred to as a temporary file system or a startup file system, may be included in the backup.

During a startup boot sequence on a given computing device, the initial file system is used to offload the kernel of the operating system and perform particular tasks before the root file system is loaded. Typically, the initial file system includes input/output (I/O) modules corresponding to device drivers for the given computing device used to setup the storage devices attached to interfaces of the given computing device. The attached disk storage devices are used during the bare metal recovery for storing the restored operating system, applications, user data and so on.

Some operating system (OS) installations use a generic initial file system and include each available I/O module within the initial file system in order to boot and load a root file system on any type of target hardware during a bare metal restore with a processor architecture compatible with the operating system. However, these OS installations consume an appreciable amount of boot time as well as disk storage space for the bare metal recovery. Other OS installations use a custom initial file system and include only I/O modules within the initial file system needed to boot and load a root file system on a same type of hardware upon which the OS and applications are currently installed. Although boot time and disk storage space are reduced for these OS installations, a bare metal recovery is only possible with other computing devices with the same type of hardware upon which the OS and applications were currently installed. A dissimilar system recovery is not possible as the initial file system does not include the necessary I/O modules.

In view of the above, improved systems and methods for efficiently restoring data to a different computing device are desired.

SUMMARY OF THE EMBODIMENTS

Systems and methods for efficiently restoring data to a different computing device are contemplated. In various embodiments, a target computing device is connected to a memory, which is configured to store a backup image file. The backup image file includes at least an operating system and a first initial file system. An initial file system may also be referred to as a temporary file system or a startup file system. Examples of the initial file system include Initial Ramdisk (initrd) and Initial Ram File System (initramfs). Each of the operating system and the initial file system may be configured for a hardware configuration for a source computing device different from a hardware configuration for the target computing device. Each of the target computing device and the source computing device may be a desktop computer, a laptop, a server, a smartphone and so forth. Each of the target computing device and the source computing device may utilize a Unix-like operating system, such as Linux or Android™, the mobile operating system for smartphones based on the Linux kernel.

Each of the target computing device and the source computing device may have a respective processor architecture that supports a same operating system although the respective architectures may be different versions of an architecture or different implementations of an architecture. Each of the target computing device and the source computing device may have one or more particular types of data storage interfaces that differ from one another by at least one interface. The backed up intended operating system and initial file system may have been stored and executed on the source computing device prior to being backed up during a backup operation. In some embodiments, the target computing device is a bare metal device with no installed software including an operating system.

Recovery program instructions for performing a bare metal recovery may be stored on recovery media such as a compact disc (CD) or a digital versatile disc (DVD). Alternatively, the recovery media may be a storage device externally connected to the target computing device. For example, the recovery media may be a locally connected device or a remote network connected device. Prior to actually initiating or executing a boot up sequence, the target computing device while executing the recovery program instructions may perform a recovery sequence. During the recovery, the target computing device while executing the recovery program instructions may identify one or more interface modules, such as Small Computer System Interface (SCSI) modules used for accessing one or more storage devices. The storage devices may be connected to one or more data storage interfaces within the target computing device. In some cases, the storage device is a network attached storage.

The target computing device while executing the recovery program instructions stored on the recovery media may make a connection to disk storage that includes the backed up operating system and the initial file system. For example, a backup server attached via a network to the target computing device may include the backed up operating system and the initial file system in addition to a backup and restore application. The application may be executed to create a copy of the backed up operating system and the initial file system on the memory connected to the target computing device. In some embodiments, the memory is a storage medium, such as hard disk drive, solid state storage, or otherwise, for the target computing device.

After the operating system and the initial file system are restored on the memory, the target computing device while executing the recovery program instructions stored on the recovery media may compare the interface modules, such as the SCSI modules, for the target computing device to interface modules found in the initial file system. The comparison may identify missing interface modules in the initial file system for the target computing device. The target computing device while executing the recovery program instructions may retrieve the missing interface modules from the restored operating system on the target computing device and insert these interface modules in the initial file system. In some embodiments, the modified initial file system is stored as a second initial file system along with the first initial file system. Afterward, a boot up sequence loads the root file system using the second initial file system.

These and other embodiments will be appreciated upon reference to the following description and accompanying drawings.

Figure 1:
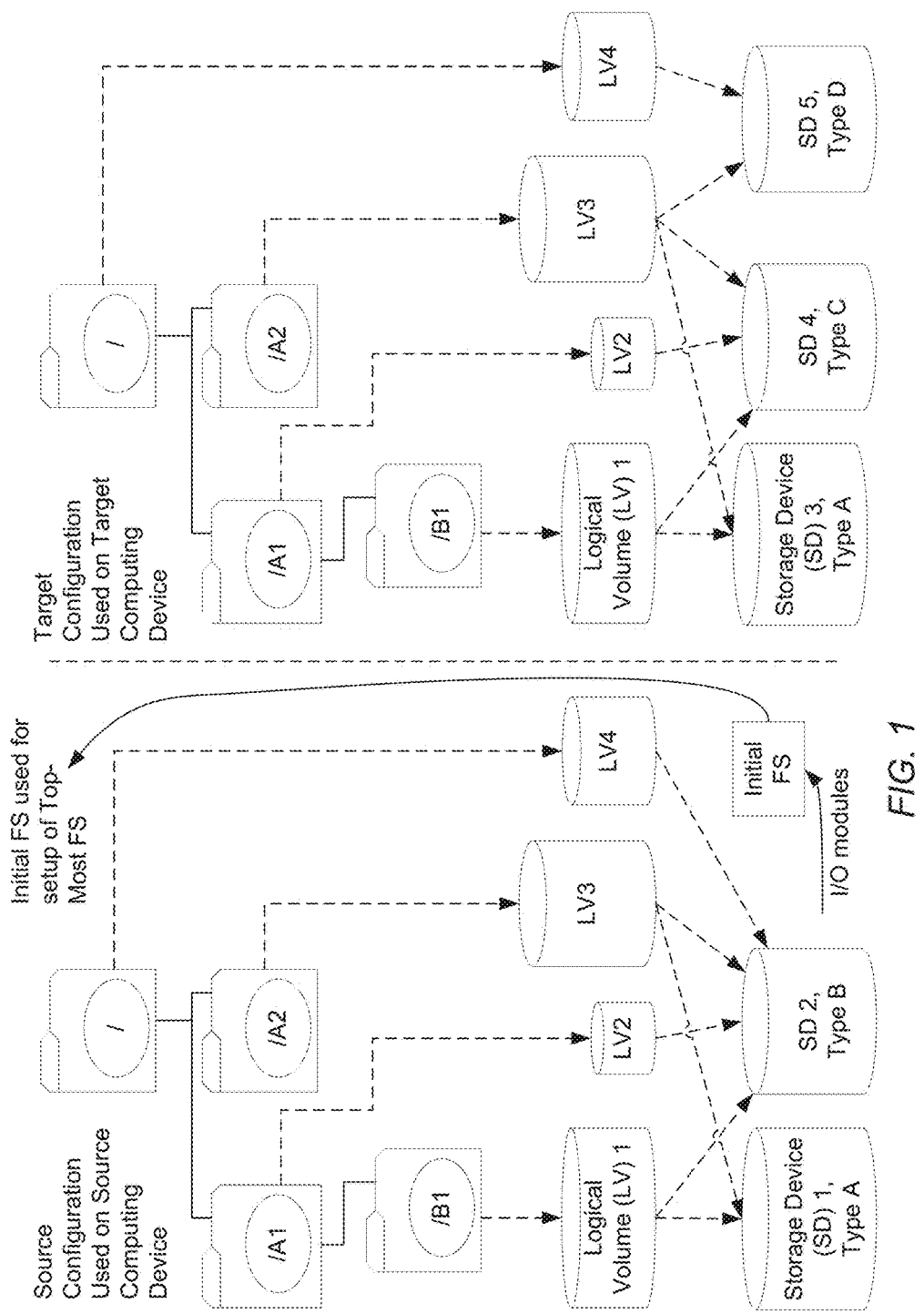
FIG. 1 is a generalized block diagram illustrating one embodiment of two configurations for a source computing device and a target computing device.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of two configurations for a source computing device and a target computing device are shown. Examples of a computing device include a desktop computer, a laptop, a server, a smartphone and so forth. The configurations are shown between a file system directory structure and storage devices connected to computing devices. Multiple intermediate levels are not shown for ease of illustration. For example, a logical volume manager, a volume group, physical volumes corresponding to partitions on the connected storage devices, device drivers corresponding to the connected storage devices, applications and application programming interfaces (APIs) are not shown. A further description of these components is provided later.

The connected storage devices are only shown as part of the hardware configuration. As is well known in the art, a hardware configuration of a computing device includes at least a processor architecture, the input/output (I/O) ports for connected peripheral devices and storage devices, an amount of on-die processor memory and an amount of off-chip memory, power management features and so forth. Here, in the figure, only the connected storage devices are shown as part of the hardware configuration for ease of illustration.

As shown, the same file system directory structure is used on the source computing device and the target computing device. The directory structure may also be referred to as a directory tree. The same directory structure used within the source computing device and the target computing device includes the top-most directory "/". The top-most directory includes two subdirectories "/A1" and "/A2". The subdirectory "/A1" also includes a subdirectory "/B2." Although the contents of the directory structure are stored on the storage devices, such as storage device (SD) 1 and SD2 for the source configuration, the directory structure, the initial FS and any metadata supporting the logical volumes are not shown within the storage devices for ease of illustration of the configurations.

In the shown example, each directory and subdirectory of the directory structure is mapped to a respective logical volume. In the example shown in FIG. 1, the subdirectory "/B1" is mapped to the logical volume (LV) 1. The subdirectory "/A1" is mapped to LV2, and so forth. Other mappings and labels are possible and contemplated. The logical volumes provide storage virtualization as the hardware storage configuration is hidden from software. Accordingly, the logical volumes may be resized and moved without interrupting applications or unmounting file systems.

The data corresponding to the logical volumes are physically stored on storage devices. The source configuration includes storage device (SD) 1 and SD2. As shown, the SD 1 is of Type A and the SD 2 is of Type B. Examples of the storage devices include local and external hard disk drives (HDDs), local and external solid-state drives (SSDs), optical drives, flash drives, network attached storage (NAS) devices, compact discs (CDs), digital versatile discs (DVDs), and so forth. As one example, the SD 1 of Type A may be an internal integrated electronics (IDE) hard disk drive (HDD), whereas the SD 2 of Type B may be a separate external redundant array of independent disks (RAID) access via a small computer system interface (SCSI) network card.

Corresponding device drivers (not shown) are used to access the SD 1 and the SD 2. Each of the device drivers may be used within an input/output (I/O) module within the kernel of the operating system. The I/O modules for the SD 1 and the SD 2 may be inserted into an initial file system (FS). The initial FS may be used to setup mounting for the root FS, which is the top-most FS, of the source computing device during a startup boot sequence. An example of the initial FS is the Initial Ram File System (initramfs).

For the target configuration, the SD 3 of Type A may also be an IDE HDD, whereas the SD 4 of Type C may be a given hard disk of multiple hard disks in a network attached storage server and the SD 5 of Type D may be a SSD in a separate storage server. A separate device driver may be used for each storage device of a different type. For example, the source configuration may use a first device driver for the SD 1 of Type A and a different second device driver for the SD 2 of Type B for a total of two device drivers for the storage devices. I/O modules for the first device driver and the second device driver may be inserted into the initial FS. The target configuration may use the first device driver for the SD 3 of Type A, a third device driver for the SD 4 of Type B, and a fourth device driver for the SD 5 of Type D for a total of three device drivers for the storage devices.

Should a bare metal restore of the information stored on the source computing device be performed on the target computing device, the third and fourth device drivers would be missing in the restored initial FS. The missing I/O modules may delay or stop a startup boot sequence on the target computing device using the restored initial FS from the source computing device. Further details of an efficient bare metal restore and startup boot sequence on dissimilar hardware, such as the example target computing device is provided later. First, a further description of the example directory structure is provided.

The example directory structure shown in FIG. 1 is used within a file system. File systems are used to store and retrieve data on storage media. The data is organized in identifiable pieces known as files. The files are organized into groups known as directories and subdirectories. File systems include at least a directory structure and utilities or logic for providing read/write functionality, security, user permission access, data integrity maintenance and so forth. The organized data is stored on media, such as the storage devices SD 1 and SD 2 for the shown source configuration and the SD 3 to SD 5 for the shown target configuration.

As can be seen from the example shown in FIG. 1, each of the source configuration and the target configuration uses a same file system and directory structure. However, the corresponding data is stored on different storage devices. Therefore, the source configuration uses different device drivers than what device drivers are used by the target configuration. In addition, the data may be divided differently. As shown, the data corresponding to the subdirectory "/A2" and LV3 is divided into two partitions in the source configuration, but the data is divided into three partitions in the target configuration. Data for a given subdirectory and corresponding logical volume that is divided across two or more storage devices of different types is accessed via the use of multiple different device drivers.

In some examples, the general directory structure may be used within a file system supported by the UNIX operating system. The UNIX operating system supports a virtual file system, which makes all the files on all the devices appear to the user as existing in a single hierarchy. In such a file system, there is one top-most root directory. Each existing file is located under in a subdirectory under the top-most root directory. Alternatively, the example directory structure is supported by the Linux operating system. The Linux operating system supports a variety of file systems. Some examples includes the extended file systems ext2, ext3 and ext4. In addition, Linux supports XFS, JFS, ReiserFS, btrfs, UBIFS, JFFS2, and YAFFS, SquashFS, and so forth. The OS X operating system from Apple Inc. supports the Hierarchical File System (HFS). Other varieties of files systems supported by multiple operating systems are also possible and contemplated. The directory structure shown in FIG. 1 is an example of a general directory structure for a general file system, although the top-most root directory denoted by "/" is also used in file systems supported by Unix and Linux.

Typically, the top-most directory, shown as "/" in FIG. 1, is the first directory mounted during a boot sequence. A file system and its corresponding top-most directory of its directory structure are considered mounted when the kernel of the operating system receives both an indication that the file system is available on a corresponding storage device and the location within the directory structure to place the file system. For example, the subdirectory "/B1" may be a second file system under the root file system "/".

The second file system may be stored on a same storage device, but a different partition, as the root file system. Alternatively, the second file system may be stored on a different storage device. Accordingly, in this case, a different device driver would be used to access the different storage device storing data for the second file system, such as "/B1", than a device driver used to access a storage device storing data for the root file system, such as "/".

Files and directories are referenced by giving the file or directory name, followed by a forward slash, /, followed by any other directory names that are necessary. For example, the root directory "/" contains the subdirectory "A1", which contains the subdirectory "B1" which may contain a file named readme.txt. Accordingly, the full name, or the path, to the file within the file system is "/A1/B1/readme.txt". Each directory and subdirectory within the directory structure may contain no files, or it may contain many hundreds of files. Additionally, each directory and subdirectory may contain other subdirectories to create the hierarchy used to organized data stored on the storage devices accessed via respective device drivers.

As described earlier, the directory structure within the file system and the logical volumes are comprised within the software of a corresponding computing device. The storage devices, such as SD 1 to SD 5 shown in FIG. 1, used to store data are comprised within the hardware of the corresponding computing device. The respective device drivers used to access the storage devices are comprised within the software of the computing device. However, the selection of the device drivers used are dependent on the selected storage devices used to store data. Accordingly, the hardware configuration of a computing device determines which device drivers are used for data access.

Generally speaking, the hardware configuration of a computing device refers to the hardware resources available for the computing device. The hardware configuration for a given computing device may include the number and the type or version of processors used by the given computing device, which may refer to the instructions set architecture (ISA) supported by the processor, the clock speed of the processor, the available bus types to interface with the processor, and the power management features of the processor. Additionally, the hardware configuration may refer to the amount of on-die cache memory for each processor, the amount of off-chip cache memory, the amount of off-chip random access memory (RAM), supported page sizes, supported address ranges for applications, the amount of memory in a locally connected hard drive, such as an IDE HDD, and the amount of memory in externally connected storage devices.

The hardware configuration also refers to the type of direct memory access (DMA) channels on the given computing device, the bus speeds available on the motherboard of the given computing device, the number and type of input/output (I/O) ports used for connecting I/O devices to the given computing device, and the number and the type of interrupt request (IRQ) lines on the given computing device, which may indicate when an event for a peripheral device has started or ended. Manufacturer names may also be included in the hardware configuration for the processor, connected storage devices, and other I/O peripheral devices connected to the given computing device. The hardware configuration information may be stored within firmware of the given computing device, such as the basic input output (BIOS) firmware. Alternatively, firmware using Unified Extensible Firmware Interface (UEFI) standard may be used over BIOS.

As can be seen from the above, many differences may exist in the hardware configuration between a source computing device and a target computing device. In many cases, a system administrator performs a backup of an entire system of the source computing device to prepare for a bare metal restore of the entire system to new hardware on a target computing device. The backup may store at least the operating system (OS), applications, user data, user application configuration metadata, and other system data used to recreate the user environment on the target computing device. The process of the backup and the bare metal restore operations may be used for disaster recovery, relatively seamless hardware upgrades, a relatively quick start setup for a new user, such as a new employee, or other.

Although the target computing device may include one or more processors, system buses, and so forth to support the applications, operating system (OS) and corresponding supported file system of the source computing device, many other hardware differences may interfere with the bare metal restore operation. For example, the available I/O ports used for storage devices may differ or include upgraded versions compared to the source computing device. As can be seen in the example in FIG. 1, the target configuration uses the same file system supported by the same OS used in the source configuration. However, the storage devices are different, which use different device drivers.

Figure 2:
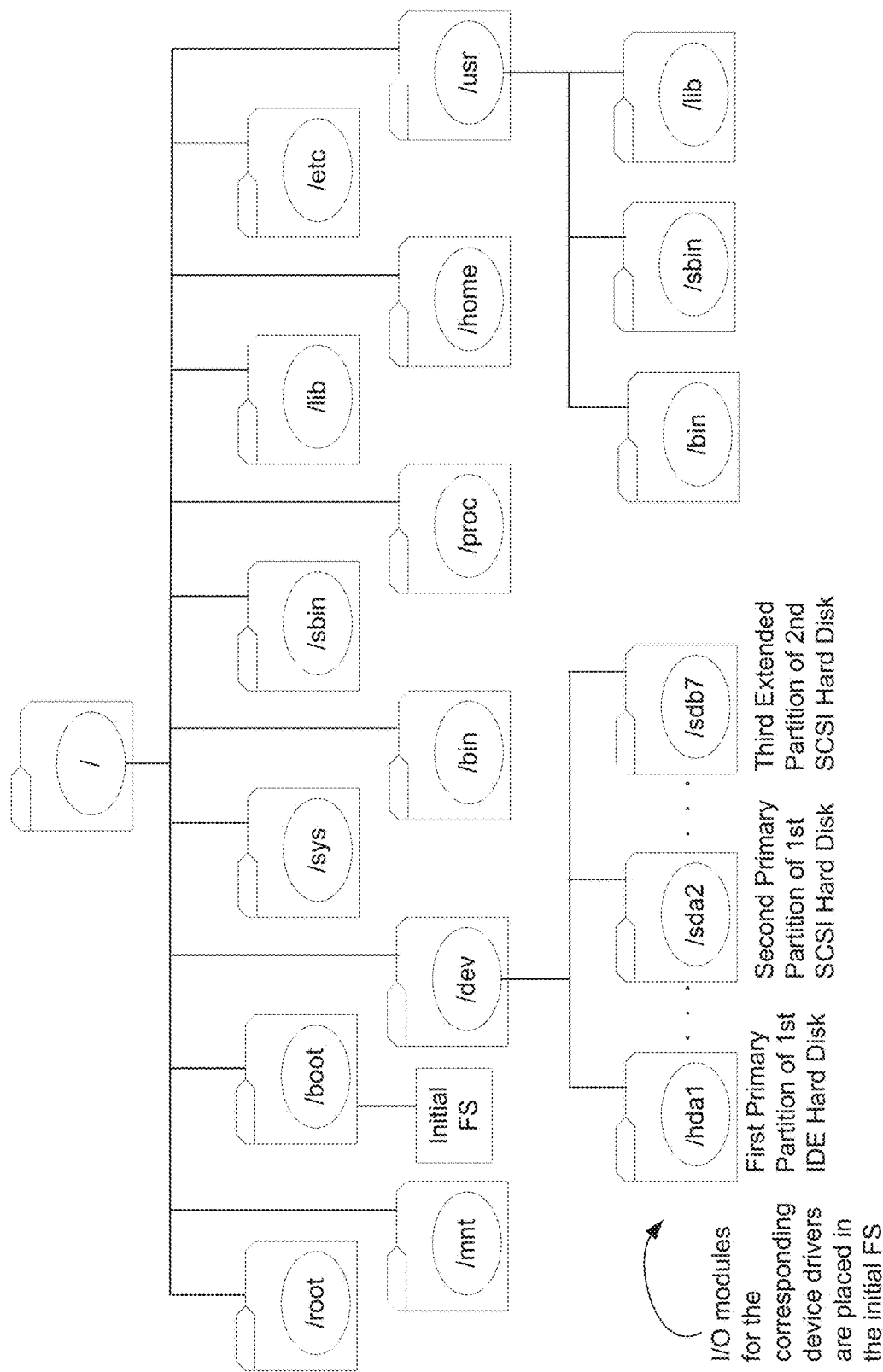
FIG. 2 is a generalized block diagram illustrating one embodiment of an exemplary directory structure.
Figure 3:
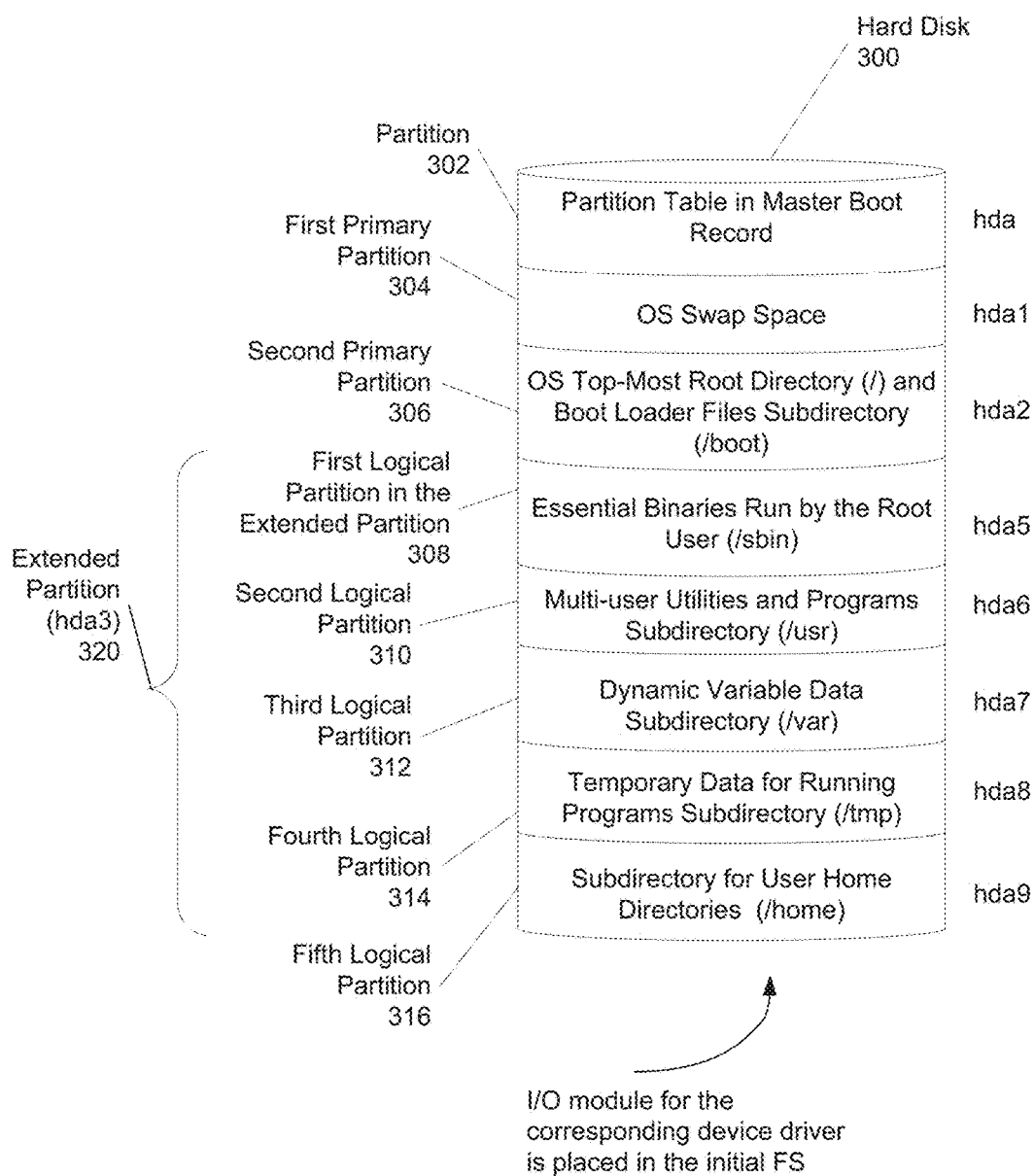
FIG. 3 is a generalized block diagram illustrating one embodiment of a partitioned hard disk.
Figure 4:
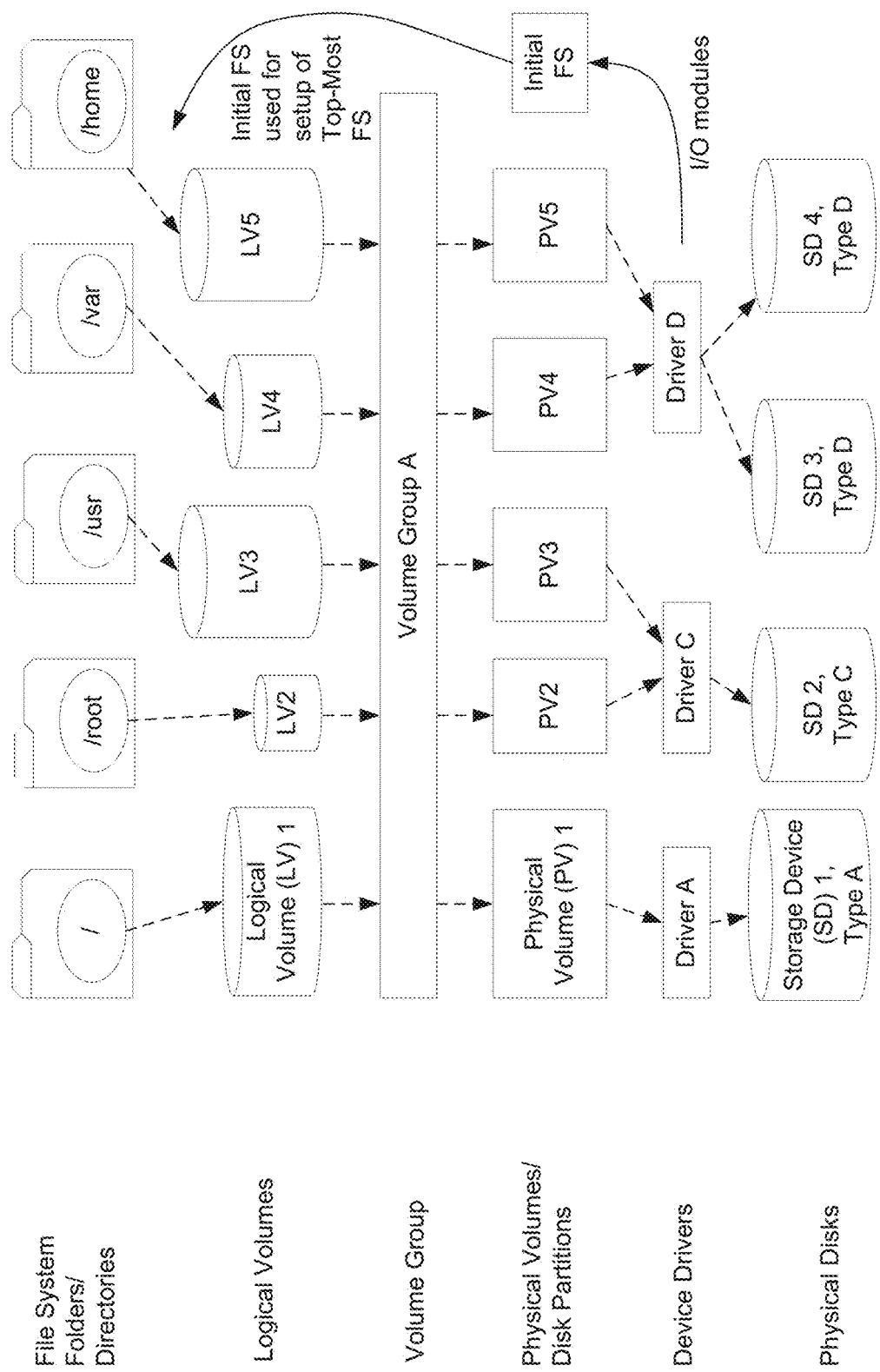
FIG. 4 is a generalized block diagram illustrating one embodiment of logical volume management.
Figure 5:
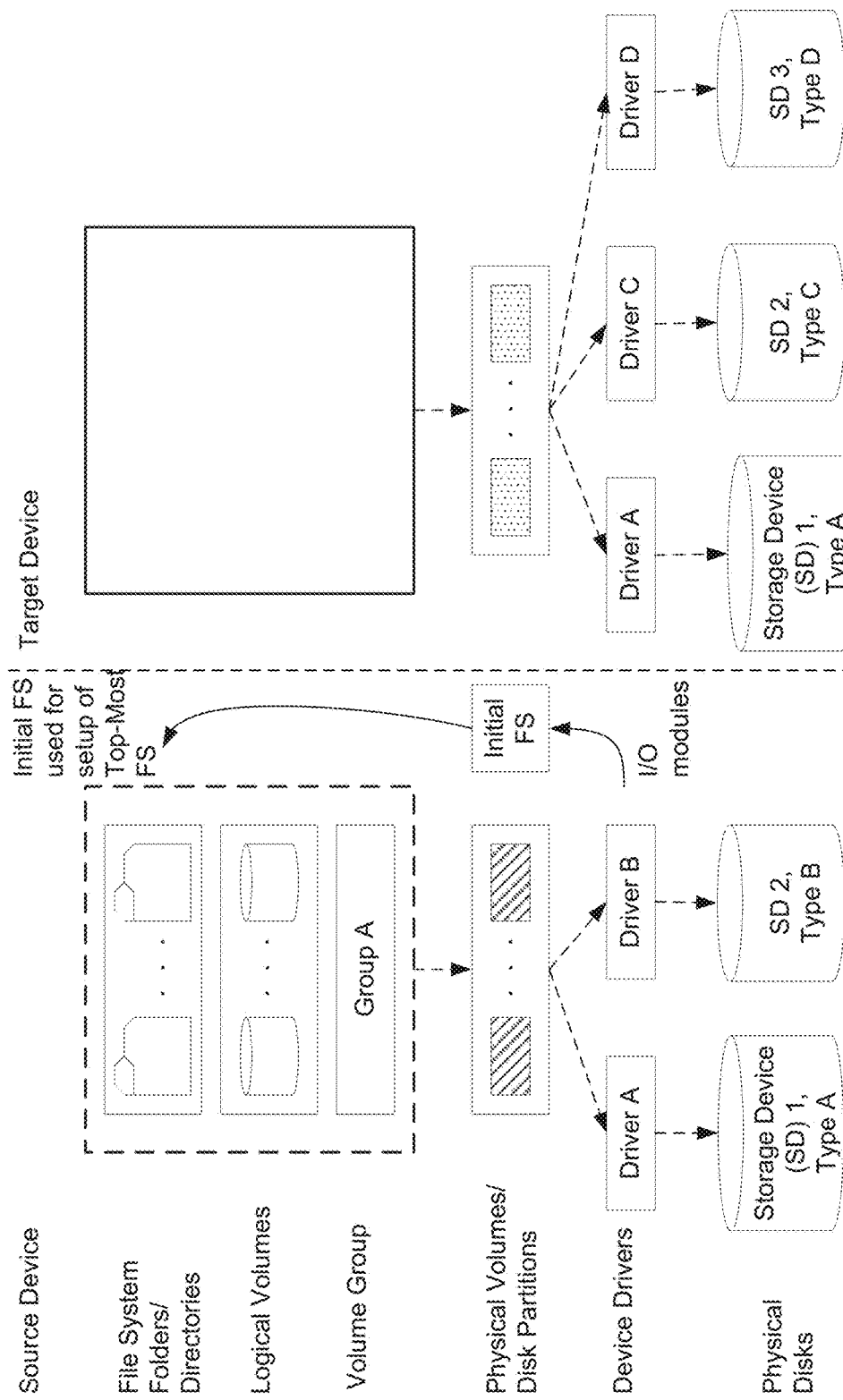
FIG. 5 is a generalized block diagram illustrating one embodiment of logical volume management for two different computing devices.
Figure 6:
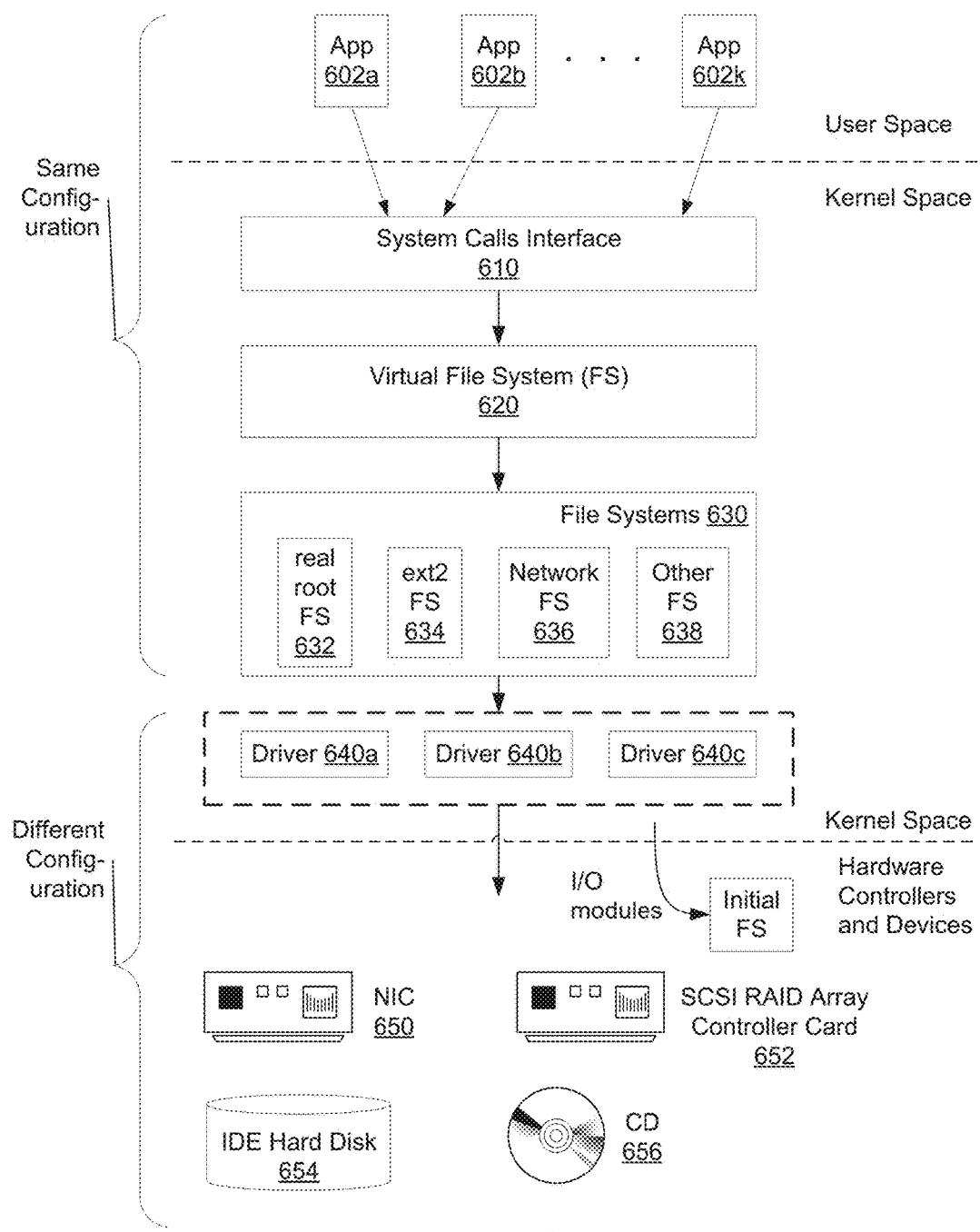
FIG. 6 is a generalized block diagram illustrating one embodiment of the layers of a system.

Before continuing with the backup and restore operations, a further description of an example file system directory structure is provided in FIG. 2, a further description of the disk partitioning used by the file system is provided in FIG. 3, and a further description of the changes in software based on hardware configuration differences are shown in FIG. 4 to FIG. 6.

Turning now to FIG. 2, a generalized block diagram of an exemplary directory structure is shown. In the example shown, a directory structure, which may also be referred to as a directory tree, supported by the Linux operating system is shown. Although the Linux operating system is selected for illustrating the directory structure, other directory structures supported by other operating systems may also be contemplated. The Filesystem Hierarchy Standard (FHS) defines the directory structure and the contents of the subdirectories within the structure. The FHS is used to describe the directory structure for file systems supported by the UNIX operating system and Unix-like operating systems, such as the Linux operating system. The latest version of the FHS is version 3.0, released on Jun. 3, 2015. The directory structure is supported by kernel modules within the corresponding operating system. The kernel modules provide utilities or logic for providing read/write functionality, security, user permission access, data integrity maintenance and so forth.

Although the subdirectories are further described within the FHS, a brief description of some of the subdirectories is provided here. The subdirectories are also referred to as folders, which are groups organized for storing file information. As shown, the top-most directory is the directory named "/". The top-most root directory "/" is the first directory mounted during a boot sequence. The operating system uses the top-most root directory "/" to prepare for single-user operation and possible multi-user operation. The top-most root directory "/" contains mount points for other file systems to be later mounted.

The subdirectory "/root" is used by the system administrator who only has write privileges in this subdirectory. The subdirectory "/sbin" contains essential binaries (programs) run by the root user for system administration. The subdirectory "/bin" contains essential binaries (programs) run by a single user. Utilities such as a shell are stored in the subdirectory "/bin". Applications, such as a web browser, are stored in the subdirectory "/usr/bin". The subdirectory "/lib" library information used by the essential binaries (programs) in each of the "/bin" subdirectory and the "/sbin" subdirectory.

The subdirectory "/boot" contains the file information used to boot the system. Boot loader files and operating system kernel files are stored in this subdirectory. The initial file system, which may also be referred to as a temporary file system or a startup file system, may also be stored in this subdirectory. Configuration files for the boot loader are stored in the "/etc" subdirectory. The subdirectory "/home" contains a home folder for each user. For example, if a user is named joe, then a home folder for the user joe is located at "/home/joe". This home folder contains the user's data files and user-specific configuration files.

The "/proc" subdirectory contains file information indicating the system and process information, such as hardware configuration including system memory, devices mounted, and so forth. Many system utilities are calls to files in this subdirectory. System administrators use the "/mnt" subdirectory to temporarily mount other file systems. The system administrator may mount a Windows partition to perform some file recovery operations and place the corresponding file system at "/mnt/windows". The system administrator and other user may also mount other file systems at other points within the directory structure. As shown in the earlier example in FIG. 1, the subdirectory "/B1" may have been a file system mounted under the subdirectory "/A1".

The subdirectory "/dev" contains file information representing I/O devices. In some examples, the file "/dev/cdrom" represents a compact disc (CD) read only memory (ROM) drive, the file "/dev/fd0" represents a floppy drive, and the file "/dev/dsp" represents a speaker device. In various examples, storage devices are represented as partitioned block devices. For example, the file "/dev/hda1" represents a first partition of a first an internal integrated electronics (IDE) hard disk drive (HDD). The naming convention uses "hd" to indicate the storage device is an IDE HDD type. The naming convention uses "a" to indicate storage devices is the first IDE HDD and uses "1" to indicate the first partition.

Similar to the above example, the file "/dev/hda2" (not shown) represents a second partition of the first IDE HDD. The file "/dev/hdb1" (not shown) represents the first partition of a second IDE HDD, the file "/dev/sda1" (not shown) represents the first partition of a SCSI or SATA disk drive, and the file "/dev/sda2" (shown) represents the second partition of the SCSI or SATA disk drive. Corresponding device drivers are used to access the storage devices with associated device files stored under the "/dev" subdirectory. The I/O modules associated with these device drivers are inserted in the initial FS. As described earlier, an example of the initial FS is the Initial Ram File System (initramfs). The initial FS may also be referred to as a temporary FS or a startup FS. The initial FS may be used during a startup boot sequence on the source computing device to setup and mount the top-most directory and the top-most FS for the source computing device.

Referring again to the differences between a source computing device and a target computing device, wherein the target computing device has a backup of the source computing device restored on it, the target computing device may list different storage devices under the "/dev" subdirectory than listed for the source computing device. Accordingly, one or more device drivers used to access the storage devices identified under the "/dev" subdirectory are different between the source computing device and the target computing device. A further example of using partitions and using a naming convention to identify the storage devices and the partitions on the storage devices, which may be used to store system information, is provided next.

Referring now to FIG. 3, a generalized block diagram of one embodiment of a partitioned hard disk is shown. Although the shown example illustrates a partitioned disk uses a master boot record (MBR) and BIOS, in other examples, the disk may be partitioned using the globally unique identifiers (GUID) partition table (GPT) standard. The GPT may be used for both systems the use BIOS and systems that use the Unified Extensible Firmware Interface (UEFI) standard. In the shown example, the hard disk 300 is divided into at least eight partitions 302-316, although a different number of partitions may be used. The eight partitions are also identified by the labels "hda" to "hda9." This naming convention is the same as used in the earlier example. Although the naming convention shown is used for an IDE HDD, the naming convention for other types of disks may use a similar format. A corresponding device driver is used to access the hard disk 300 with associated device files for the partitions stored under the "/dev" subdirectory. The I/O module associated with the device driver is inserted in the initial FS. As described earlier, an example of the initial FS is the Initial Ram File System (initramfs).

Each one of the partitions 302-316 is used as if it was a separate hard disk by the operating system and corresponding file system. Partitioning the hard disk 300 allows multiple operating systems and file systems to have information stored on the hard disk 300. Each operating system and each file system within a respective operating system uses a corresponding partition independently from other operating systems and other file systems. Without partitions a separate hard disk may be used for each separate operating system and each separate mounted file system. The partitioning scheme is not built into the hardware or BIOS, but rather, the partitioning scheme is a convention that many operating systems follow.

The partition 302, which is also named "hda" in one naming convention, stores information, such as the partition table, describing how the hard disk 300 is partitioned. In various embodiments, the partition 302 also stores the master boot record (MBR), which is read by BIOS when the computing device is booted. The MBR contains a small program that reads the partition table, checks which partition is active, or considered bootable, and the MBR reads the first sector of that partition. The partition's boot sector contains another small program that reads the first part of the operating system stored on that partition and starts it. Alternatively, in other embodiments, the system does not use the MBR, but rather the Unified Extensible Firmware Interface (UEFI) standard.

The partition 304, which is also named "hda1" in one naming convention, stores swap space. Swapping is the process whereby a page of memory is copied to the partition 304 on the hard disk 300 to free up that page of memory. The combined sizes of the physical memory and the swap space is the amount of available virtual memory available. Swapping allows the kernel to swap out less used pages and gives memory to the current application (process) that currently consumes the memory. Additionally, a significant number of the pages used by an application during its startup phase may be used for initialization and not used again. The system may swap out those pages and free the memory for other applications.

The partition 306, which is also named "hda2" in one naming convention, stores the top-most root directory. The partitions 304-306 are referred to as primary partitions. In the past, hard disks were partitioned into four partitions, but four partitions became insufficient. Therefore, the hard disk 300 may be divided into four primary partitions, and a primary partition may be further divided into extended partitions. Primary partitions are numbered 1 to 4, and extended partitions begin numbering with 5. These partition traits are particular to file systems supported by the Linux operating system and used as an example. Other partitioning schemes and naming conventions are possible and contemplated.

As shown, the hard disk 300 has two primary partitions 304 and 306, which are also named "hda1" and "hda2". The hard disk 300 also includes an extended partition 320 with five logical partitions 308-316, which are also named "hda5" to "hda9." In the shown example, each of the logical partitions 308-316 stores a separate subdirectory under the top-most root directory "/" stored in the partition 306.

Each one of the primary partitions 304-306 and each one of the logical partitions 308-316 has a respective device file in the "/dev" subdirectory of the file system. For example, the primary partition 306 has a corresponding device file "/dev/hda2." The logical partition 310 has a corresponding device file "/dev/hda6," and so on. Again, for a target computing device having backup information for a source computing device restored on it, the partitioning scheme, storage devices, the device drivers, and the device files may be different than what is used in the source computing device.

Turning now to FIG. 4, a generalized block diagram of one embodiment of logical volume management is shown. Similar to the earlier example shown in FIG. 1, the subdirectories of a directory structure of a supported file system are mapped to logical volumes. Here, the top-most directory "/" is mapped to the logical volume (LV) 1. The subdirectory "/root" is mapped to LV2, and so forth. Other mappings and labels are possible and contemplated.

As described earlier, the logical volumes provide storage virtualization as the hardware storage configuration is hidden from software. The logical volumes may be resized and moved without interrupting applications or unmounting file systems. Each logical volume may correspond to a respective disk partition, and accordingly, to a respective device file in the "/dev" subdirectory in a file system. Typically, the logical volumes are mapped one-to-one with physical volumes (PVs). However, with mirroring, multiple PVs may map to a same LV. In the shown example, the PV 1 is mapped to the LV 1, the PV 2 is mapped to the LV 2, and so forth. In various examples, the physical volumes may be grouped for management purposes, such as PV 1 to PV 5 are shown grouped into Volume Group A.

Similar to the earlier example shown in FIG. 1, some subdirectories have corresponding data stored across multiple partitions that may be located on different storage devices. As shown in FIG. 4, the data stored in the top-most directory "/" and mapped to LV 1 and PV 1, is stored on partitions located on the storage device (SD) 1 of Type A. Therefore, the device driver A is used for accesses to this stored data. Similarly, the data stored in the subdirectory "/usr" and mapped to LV 3 and PV 3 is stored on the partition located on the SD 2 of Type C. Accordingly, the device driver C is used for accesses to the stored data. A similar mapping and usage of a device driver is performed for the other subdirectories.

The device driver A, the device driver C, and the device driver D have corresponding I/O modules inserted into the initial FS. The initial FS may be used to setup mounting for the root FS, which is the top-most FS, of the computing device during a startup boot sequence. An example of the initial FS is the Initial Ram File System (initramfs).

Referring now to FIG. 5, a generalized block diagram of one embodiment of logical volume management for two different computing devices is shown. As shown, each of the source computing device and the target computing device may use a same file system, a same directory structure for the file system, a same logical volume mapping, and a same physical volume group. The device driver A and the device driver B have corresponding I/O modules inserted into the initial file system (FS). The initial FS may be used to setup mounting for the root FS, which is the top-most FS, of the source computing device during a startup boot sequence. An example of the initial FS is the Initial Ram File System (initramfs). In various cases, the target computing device has backup information of the source computing device restored on it.

As shown, the partitioning of the stored data and the storage devices used to store the data are different between the source computing device and the target computing device. Accordingly, the device drivers are different between the source computing device and the target computing device. For example, the source computing device uses device driver A and device driver B. The target computing device uses device driver A, device driver C and device driver D. The differences in the storage devices and the corresponding device drivers may provide additional complexity to a bare metal restore operation and a startup boot sequence for the target computing device. The restored initial FS stored on the target computing device after the bare metal restore operation does not include I/O modules for the device driver C and the device driver D.

Referring now to FIG. 6, a generalized block diagram of the layers of a system are shown. The user space, kernel space and hardware layers are shown. When backup information of a source computing device is restored on a target computing device, the user space and the kernel space not including the device drivers may be the same for the target computing device. However, the hardware configuration for the target computing device may be different than the hardware configuration for the source computing device such that one or more of the device drivers and the connected storage devices are different.

As shown, the user space includes applications 602a-602k. The applications may include a variety of user applications such as text editing software, numerical analysis or computation software, and so forth. The applications 602a-602k generate system calls received by the system call interface 610 of the kernel space. The interface 610 calls corresponding functions within the virtual file system (VFS) 620. Operating systems, such as the Linux operating system, includes the VFS 620 layer which is used during system calls from the applications 602a-602k generating access requests of data stored in files on connected storage devices.

The VFS 620 layer is used to ease the integration of multiple file system types. The VFS 620 layer is an indirection layer for handling the system calls and calls the corresponding functions in the code or utilities of a corresponding one of the physical file systems 632-638 of the file systems 630 in order to perform the correct input/output (I/O) access request. The I/O request is sent to the correct device driver of the drivers 640a-640c based on the connected storage device to access. A network interface card (NIC) 650, a SCSI RAID array card 652, an IDE hard disk 654, and a CD 656 are shown as connected storage devices. However, as described earlier, the connected storage devices may include a variety of additional devices such as SATA disk drives, SSDs, optical drives and the like. The differences in the storage devices and the corresponding device drivers between the source computing device and the target computing device may provide additional complexity to a bare metal restore operation for the target computing device.

Figure 7:
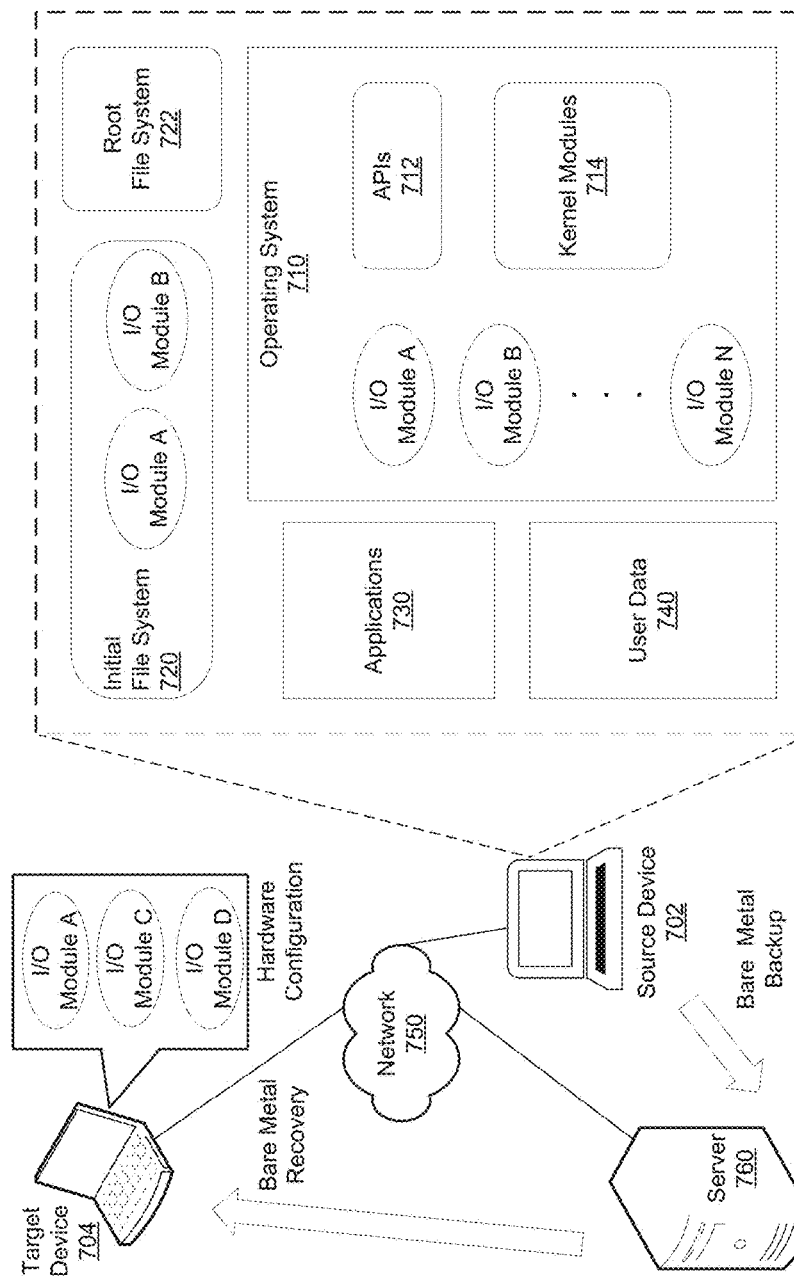
FIG. 7 is a generalized block diagram illustrating one embodiment of a bare metal restore process and a bare metal recovery process for computing devices.

Turning now to FIG. 7, a generalized block diagram of one embodiment of a bare metal restore process and a bare metal recovery process for computing devices is shown. In the embodiment shown, each of a source computing device 702 and a target computing device 704 is connected to a server 760 via a network 750. One or more of the source computing device 702 and the target computing device 704 may be connected to other forms of data storage, such as a separate hard drive. Each of the source computing device 702 and the target computing device 704 may be a desktop computer, a laptop, a server, a smartphone and so forth.

Connections between the computing devices 702 and 704, and between the server 760 and other serves and other devices, may include wireless connections, direct local area network (LAN) connections, wide area network (WAN) connections such as the Internet, routers, transmission control protocol/internet protocol (TCP/IP) hardware and/or software, and so forth. One or more of the servers and the deployed devices may be located locally onsite, remotely at another site or branch office, or accessed through a cloud-based network.

In various other embodiments, one or more of the source computing device 702 and the target computing device 704 may be connected to a separate server or not connected to any server, but rather a local storage device. In yet other embodiments, one of the source computing device 702 and the target computing device 704 is not connected to the server 760 at the same time as the other computing device. For example, the source computing device 702 may be used while the target computing device 704 is not used at all. Selected data may be backed up and restored between the source computing device 702 and the server 760.

In another example, at a time after using the source computing device 702, the target computing device 704 may be used while the source computing device 702 is not used at all. Selected data may be backed up and restored between the target computing device 704 and the server 760.

As shown, the source computing device 702 includes an operating system (OS) 710, an initial file system (FS) 720, which may also be referred to as a temporary FS 720 or a startup file system 720, a root file system (FS) 722, which may also be referred to as a real root FS 722, applications 730 and user data 740. The OS 710 includes at least one or more application programming interfaces (APIs) 112, one or more kernel modules 114, and input/output (I/O) modules A-N supporting I/O interfaces for connecting I/O devices, such as storage devices.

In various embodiments, the I/O modules are Small Computer System Interface (SCSI) modules used for accessing one or more storage devices, peripheral devices and other computing devices. The SCSI specifications support multiple interfaces, such as the Serial Storage Architecture (SSA), Fibre Channel, Serial Attached SCSI (SAS), Internet SCSI (iSCSI), ATA Packet Interface (ATAPI), Parallel SCSI, and so on. The I/O modules may also include modules for accessing other types of connected storage devices such as IDE HDDs, SSDs, optical drives and the like.

The I/O modules may be loadable kernel modules (LKMs), which are object files containing code to extend the running kernel, which is also known as the base kernel, of the OS 710. The LKMs may be dynamically loaded and unloaded based on need for the functionality. LKMs typically add support for new hardware, new file systems, and new system calls. When the functionality provided by a particular LKM is no longer required, the particular LKM is unloaded to free memory storage.

Without LKMs, the OS 710 would include compiled code directly in the base kernel for each anticipated functionality. Much of that functionality may reside unused in memory, but consuming memory storage. In addition, users would rebuild and reboot the base kernel each time new functionality was to be added to the base kernel. The I/O modules are compiled code that can be inserted into the base kernel within the OS 710 at run-time. Device drivers are code that run within the kernel of the OS 710 to communicate with hardware devices. Device drivers may be built as I/O modules in order to be dynamically loaded and unloaded later.

Although the source computing device 702 may not include I/O interfaces for each of the I/O modules A-N, the OS 710 includes each of the I/O modules A-N to be possibly loaded in the base kernel. In the example shown, the source computing device 702 utilizes I/O module A and the I/O module B. Accordingly, the initial FS 720 includes the I/O module A and the I/O module B. In various embodiments, the initial FS 720 is an Initial Ramdisk (initrd) or an Initial RAM File System (initramfs) file. The initial FS 720 is a relatively small file system compared to the root FS 722. A further description of the initial FS 720 is provided shortly.

As with any file system, the root FS 722 defines a directory structure for organizing and storing pieces of information grouped into files. Metadata and utilities within the root FS 722 provides organization and security for the stored information. The root FS 722 includes utilities for creating, listing, copying, moving and deleting both directories and files. The implementation of the root FS 722 may depend on the type of medium storing the information. For example, flash drives, tape drives, optical drives, and disk drives may each have a respective root file system. In addition, the root FS 722 is dependent on the OS 710 for support.

The root FS 722 includes the root directory, which is the first or top-most directory in the hierarchy. As described earlier, the root FS 722 is included on a same disk partition on which the root directory is located. Any other file systems are mounted (loaded in memory for use) on top of the root FS 722. For example, one or more other file systems may be mounted on the root FS 722 during the system boot up.

The initial FS 720 is a copy of an initial FS that is loaded by the kernel of the OS 710 during the startup process for the OS 710. As described earlier, examples of the initial FS 720 include the Initial Ramdisk (initrd) and the Initial RAM File System (initramfs). The initramfs replaced the initrd in many OS distributions. The kernel of the OS 710 mounts the initial FS 720 as an initial root file system and begins the init process from the initial FS 720. The initial FS 720 completes particular tasks prior to the root FS 722 is loaded. The initial FS 720 contains tools to mount the root FS 722.

To create the initial FS 720, such as an initramfs file, the tools Genkernel and Dracut may be used. Taking Dracut as an example, the tool Dracut relies on device managers run by the kernel of the OS 710, such as udev. The device manager manages device nodes in the "/dev" subdirectory of the directory structure of a corresponding file system. The device manager provides a standard method to obtain persistent device names, even for removable drives. The actions of the device manager are communicated to all the programs that request to be notified.

The tool Dracut replaces the generation of the initial FS 720 from distributions of operating systems. Should each distribution use its own tools for creating the initial FS 720, the possibility of errors increases. The tool Dracut provides an attempt to efficiently generate, run and maintain a general-purpose initial FS 720 using the device manager. The tool Dracut is also an attempt to move away from distribution-specific systems. The general-purpose initial FS 720 generated by Dracut relies on the device manager to generate symbolic links to device nodes, which are also referred to as device files, and when the real root FS 722 device node appears, the real root FS 722 is mounted and control is switched to it. The Dracut tool uses a series of generator modules to install desired functionality into the initial FS 720.

In many cases, OS distributions from manufacturers include a generic kernel image to boot on a wide variety of hardware. The device drivers for this generic kernel image are included as loadable kernel modules (LKMs). The LKMs were described earlier. The LKMs replace multiple statically compiled device drivers placed into the single generic kernel image. The multiple statically compiled device drivers may cause the kernel image to increase to a size that exceeds memory resources on computers with limited memory and prevent boot up of the computer. However, including the multiple device drivers for the generic kernel image as LKMs in the kernel image causes the problem of detecting and loading the particular interface or input/output (I/O) modules corresponding to the device drivers used for mounting the root FS 722 at boot time.

In addition to the above issue of selecting the particular I/O modules used for mounting the root FS 722, an additional issue is determining the location of the root FS 722 and what type of file system is the root FS 722. The root FS 722 may be located on a software RAID volume, on a logical volume managed by a logical volume manager (LVM), on storage accessed via a network file system (NFS), or on an encrypted partition. Each location has respective tasks to perform in order to mount a root file system. Rather than include code in the kernel image to handle the above issues, an initial boot stage that uses the initial FS 720 is used to perform tasks to handle the above issues. The initial FS 720 is also referred to as early user space.

The initial FS 720 may setup a subset of the subdirectories that could be setup by the root FS 722, such as "/bin" for storing binaries, "/etc", "/dev" for storing device nodes, "/proc" for storing kernel information and later discovered hardware configuration information, "/lib", "/tmp", "/init" containing a file executed by the kernel of the OS 710 during the init process, and so forth. In addition to mounting the root FS 722, which may be an encrypted FS, a logical FS or other particular type of FS, the initial FS 720 includes static binaries and scripts for other features. These other features may include providing a minimalistic rescue shell for when problems arise and customizing the boot process with a welcome and other messages known as boot splashes.

When the kernel of the OS 710 mounts the initial FS 720, such as the initramfs file, the root partition is not yet mounted. Therefore, there still does not exist any access to other files. Any functionality, such as a shell or splash message, desired by the user early in the boot process needs to be included in the initial FS 720. Mount utilities are included for mounting any file system early. For loading modules, the initial FS 720 provides both the module and the corresponding utility to load it. If any utility depends on libraries in order to function, then the initial FS 720 needs to additionally include the libraries. The initial FS 720 has to independently function as it is the initial file system and code used during the startup process.

The user data on the source computing device 702 may frequently contain crucial information. Therefore, the user data may be archived, or backed up, to an archival storage to prevent loss or corruption of data. The backed up data may be placed in an image file containing tables, records, and indexing information for the backed up data. In addition to backing up user data, the user may want to back up the entire software system at a particular session or a particular state of the source computing device 702 including the OS 710, the initial FS 720, the root FS 722, the applications 730, the user data 740 and any other metadata, such as user configuration information, permissions and settings, used to restore the entire software system on a hardware system. The type of back up of the particular session or particular state of the software system meant to be restored on a bare metal computing device is referred to as a backup. The bare metal computing device may not have any installed software including no installed operating system.

As shown in FIG. 7, a backup may be performed on the source computing device 702. In various embodiments, the backup data may be stored on the server 760. In various other embodiments, the backup data may be stored in other locations, such as a local, but external, hard drive. The Symantec Backup Exec application is one example of a backup application used for performing the backup of the source computing device 702.

The backup data may be later restored from the server 760 to the target computing device 704. In various embodiments, the target computing device 704 is a bare metal computing device with no installed operating system and no installed software applications. Restoring backup data on a bare metal computing device is referred to as a bare metal restore or a bare metal recovery. The Symantec Backup Exec application is one example of a backup application used for performing the bare metal recovery of the backup data stored on the server 760.

In some embodiments, the target computing device 704 is a newer device than the source computing device 702 and utilizes newer hardware. In various embodiments, the target computing device 704 has a different hardware configuration than a hardware configuration for the source computing device 702. For example, each of the source computing device 702 and the target computing device 704 may have a respective processor architecture that supports a same operating system although respective architectures may be different versions of a same architecture or the respective architectures are different implementations of a same architecture.

The newer hardware configuration of the target computing device 704 may support a newer version of the OS 710 installed on the source computing device 702. Additionally, each of the source computing device 702 and the target computing device 704 may have one or more particular types of data storage interfaces that differ from one another by at least one interface. As shown, the source computing device 702 utilizes I/O module A and I/O module B. In addition, the initial FS 720 includes I/O modules, such as the I/O module A and the I/O module B shown in the example. The target computing device 704 utilizes I/O module B, I/O module D and I/O module E. Again, the I/O modules correspond to device drives used to access connected storage devices. The target computing device 704 may have one or more different connected storage devices than the storage devices used for the source computing device 702. Referring again to FIG. 1 and FIG. 4 to FIG. 6, multiple examples of the differences in hardware configurations including at least the storage devices and corresponding device drivers was shown.

Figure 8:
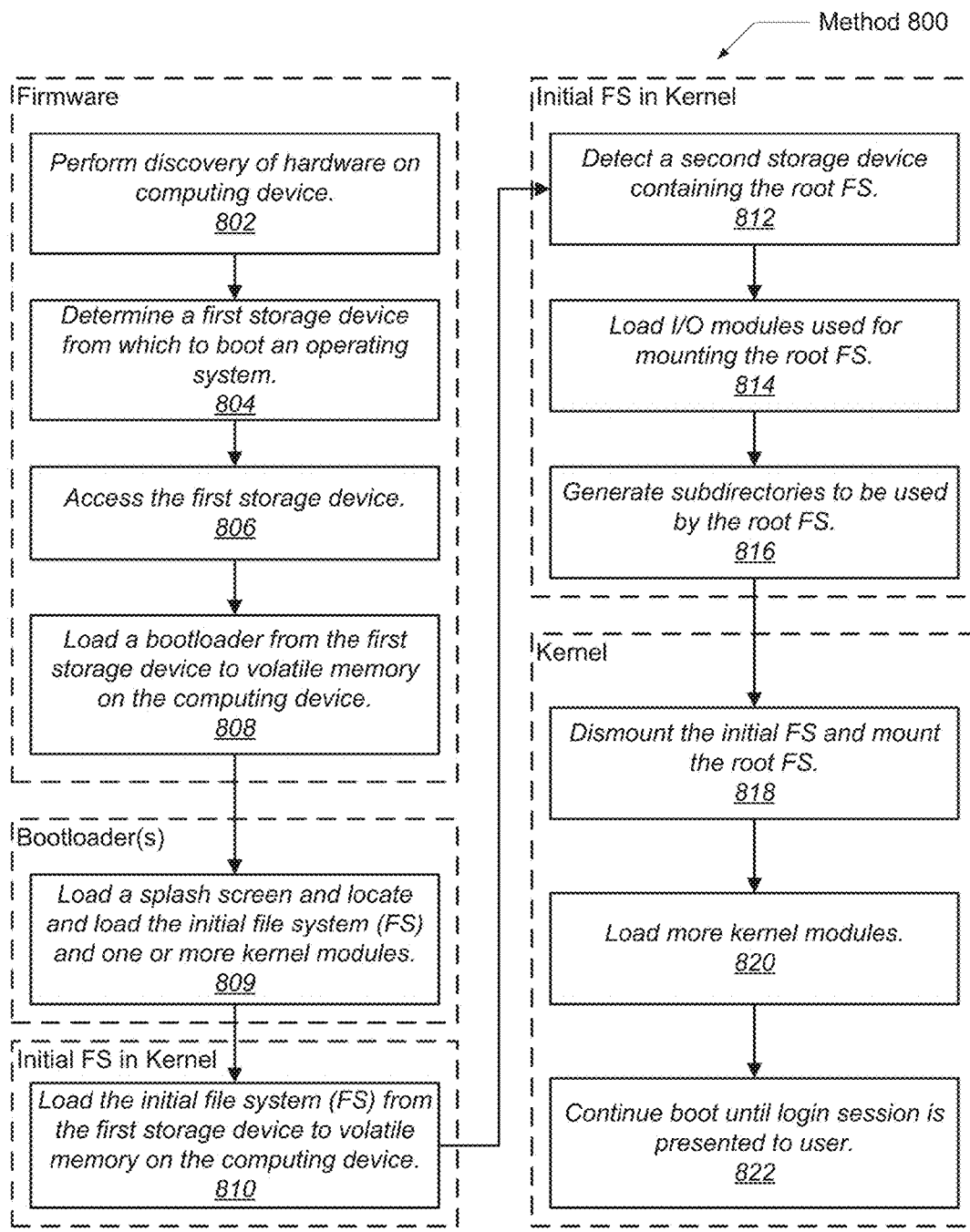
FIG. 8 is a flow diagram illustrating one embodiment of a method for performing a startup boot of a computing device using an initial file system.

Referring now to FIG. 8, an embodiment of a method 800 for efficiently booting a computing device using an initial file system is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 802, a discovery of hardware is performed on the computing device. Firmware may perform the discovery. For example, BIOS stored on a small read only memory (ROM) module on the motherboard may perform discovery. The firmware may access other ROMs and other modules on the motherboard to perform the discovery of the hardware components on the computing device which make up the hardware configuration. The firmware may test one or more hardware components during a power-on self-test (POST).

After successfully completing the POST, in block 804, the firmware determines a first storage device from which to boot an operating system. In various embodiments, the first storage device may be an IDE HDD. However, other storage devices both locally connected and externally connected are possible and contemplated. The firmware may attempt to detect a storage device from which to boot from a list of storage devices. The firmware may traverse the list in a particular order. When a storage device does not work, the next available storage device on the list is attempted. As described earlier, for a storage device to be considered bootable, the storage device is checked for a master boot record (MBR) in its first sector.

In block 806, the firmware accesses the first storage device. In block 808 the firmware loads other software known as a bootloader into random access memory (RAM) on the computing device. In various embodiments, the bootloader is an initial bootloader, such as the master boot record (MBR) found in the first sector of the first storage device. The MBR may be read by the firmware, such as BIOS. The MBR contains a small program that reads the partition table, checks which partitions are active, and loads one or more subsequent bootloaders. In some embodiments, the subsequent bootloaders include GRand Unified Boot (GRUB) bootloader stages. In block 809, the one or more bootloaders load a splash screen. The splash screen may present a list of available kernel modules to the user for selection. After a timeout, default kernel modules may be loaded. In block 810, the loaded kernel modules configure hardware and allocated memory for the system. The loaded kernel modules load and uncompress the initial file system (FS) from the first storage device to volatile memory, such as the RAM, on the computing device. As described earlier, an example of the initial FS is the initramfs image. The initial FS may also be referred to as a temporary FS or a startup FS.

In block 812, the initial FS detects a second storage device containing the root FS. The initial FS includes utilities for performing the search for the root FS. The root FS may be stored in one of several different locations that provide a complicated access. The complicated access may use kernel modules that are not able to be simultaneously compiled into the kernel core as the memory space would be large. Thus, the initial FS includes only the necessary modules and utilities for performing the search and access. For example, the root FS may be located on network access storage devices, on storage devices connected through iSCSI, ATA over Ethernet (AoE), Fibre Channel over Ethernet (FCoE), and so on. Additionally, the root FS may be encrypted or may prompt a user for authorization such as a userid and password. Less complicated access may be provided by SCSI controllers and SATA interfaces based on a wide range of chip sets, each utilizing only a single kernel module of the multiple kernel modules in the kernel core. Therefore, the initial FS may be appreciably smaller than the kernel and relatively easier to load into RAM to perform early steps in the boot process.

In block 814, the initial FS loads I/O modules used for mounting the root FS. Typically, the I/O modules are preloaded into the initial FS based on a hardware discovery of the running computing device. However, during a bare metal recovery on a target computing device, the I/O modules used by the target computing device are still unknown and not loaded into the initial FS. Rather, the initial FS includes the I/O modules used by the source computing device from which the backup information is based. The I/O modules for the target computing device may be inserted into the initial FS prior to the initial FS is used to mount the root FS. These steps are further described later.

In block 816, the initial FS generates one or more subdirectories used by the root FS. For example, as described earlier, the initial FS may generate the subdirectories such as "/bin" for storing binaries, "/etc", "/dev" for storing device nodes, "/proc" for storing kernel information and later discovered hardware configuration information, "/lib", "/tmp", "/init" containing a file executed by the kernel of the OS 710 during the init process, and so forth. In block 818, kernel modules may dismount the initial FS and remove it from the RAM in the computing device. However, the generated subdirectories remain. The kernel modules may also mount the root FS. In block 820, the kernel modules may run the program titled "init," may load more kernel modules and check the integrity of the mounted root file system. In block 822, the kernel modules finish the boot process and provide a login session for the user.

Figure 9:
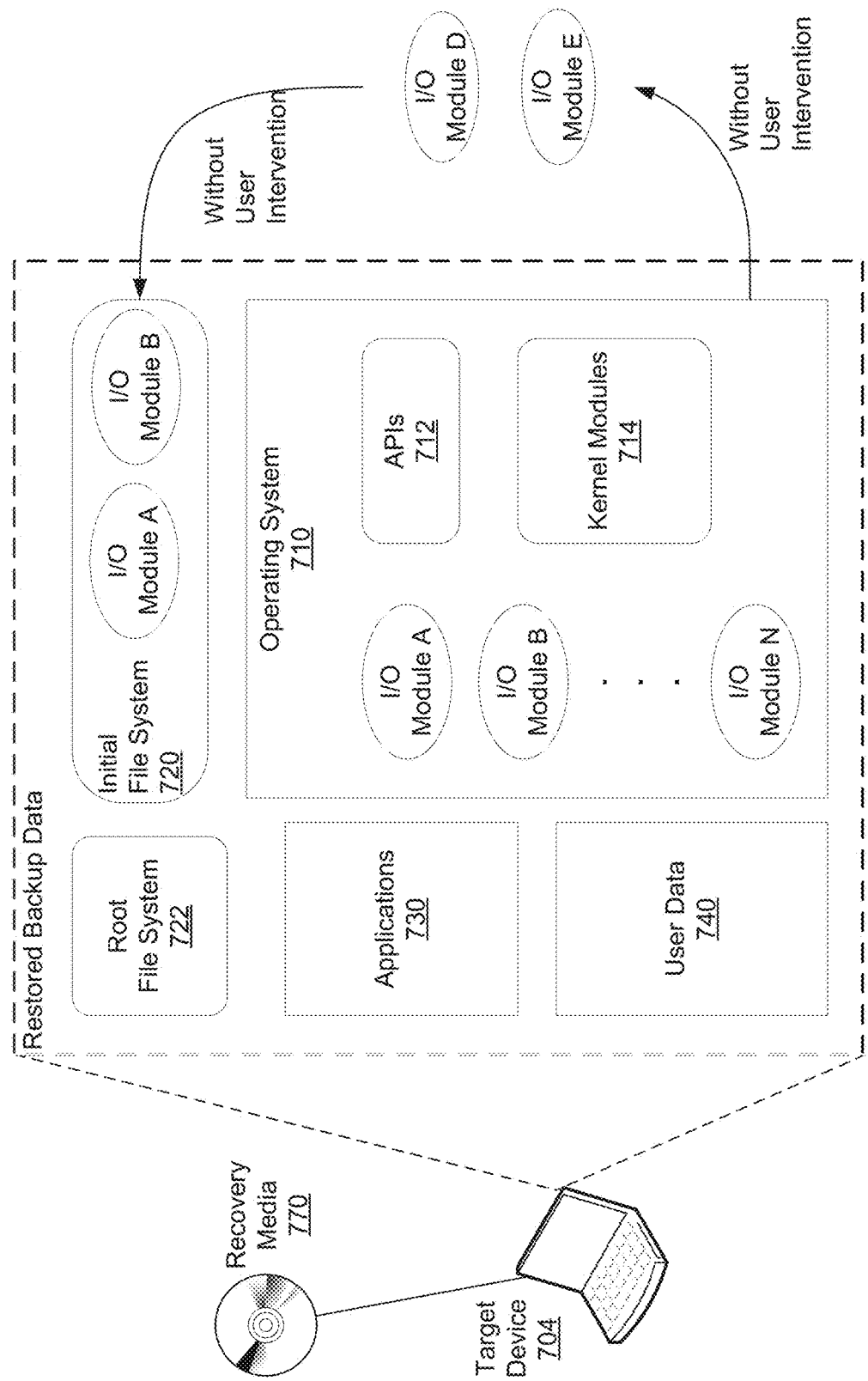
FIG. 9 is a generalized block diagram illustrating one embodiment of modifying the initial file system without user intervention after a bare metal restore.

Prior to performing the startup boot sequence on the target computing device as described in method 800, the restored initial FS on the target computing device may be modified without user intervention. A further description of these modifications without user intervention follows in FIG. 9 to FIG. 11. Turning now to FIG. 9, a generalized block diagram of one embodiment of modifying the initial file system without user intervention after a bare metal restore is shown. Here, the previous bare metal target computing device 704 now includes the backup information of the source computing device 702 in the previous example. In various embodiments, the recovery media 770 used to perform a discovery on the target computing device 704 and to initiate the bare metal restore on the target computing device 704 is stored on a compact disc (CD). In other embodiments, the recovery media 770 may be stored on another type of storage device.

As previously shown, the target computing device 704 may use storage devices corresponding to the I/O module A, the I/O module C, and the I/O module D. The restored initial FS 720 does not include the I/O module C and the I/O module D, which were not used by the hardware configuration of the source computing device 702. The initial FS 722 may be modified without user intervention prior to startup booting of the target computing device 704. For example, the I/O module D and the I/O module E may be inserted without user intervention into the initial FS 722 prior to the startup booting of the target computing device 704.

In various embodiments, the recovery media 770 includes recovery program instructions to determine without user intervention the I/O modules needed by the target computing device 704 and determine without user intervention the missing I/O modules in the restored initial FS 720. In addition, the target computing device 704 while executing the recovery program instructions may retrieve without user intervention the missing I/O modules from the restored OS 710 and insert the missing I/O modules in the initial FS 720 to create a second version of the initial FS 720. Alternatively, one version of the initial FS 720 is maintained and the missing I/O modules are inserted in the original initial FS 720. Additionally, the recovery media 770 may include recovery program instructions to determine without user intervention the dependency files used by the missing I/O modules, retrieve the dependency files from the restored OS 710 and insert the retrieved dependency files in the copy of the initial FS.

In some embodiments, the recovery media 770 may store recovery program instructions for creating a copy of the initial FS 720 and using the copy for the startup boot sequence of the target computing device 704. In some embodiments, the recovery media 770 may store recovery program instructions for replacing the original initial FS 720 with the copy, thus, removing the original initial FS 720 and only keeping the modified copy of the initial FS. In some embodiments, the target computing device 704 while executing the recovery program instructions stored on the recovery media 770 may remove from the copy of the initial FS 720 the one or more I/O modules not used by the target computing device 704.

Figure 10:
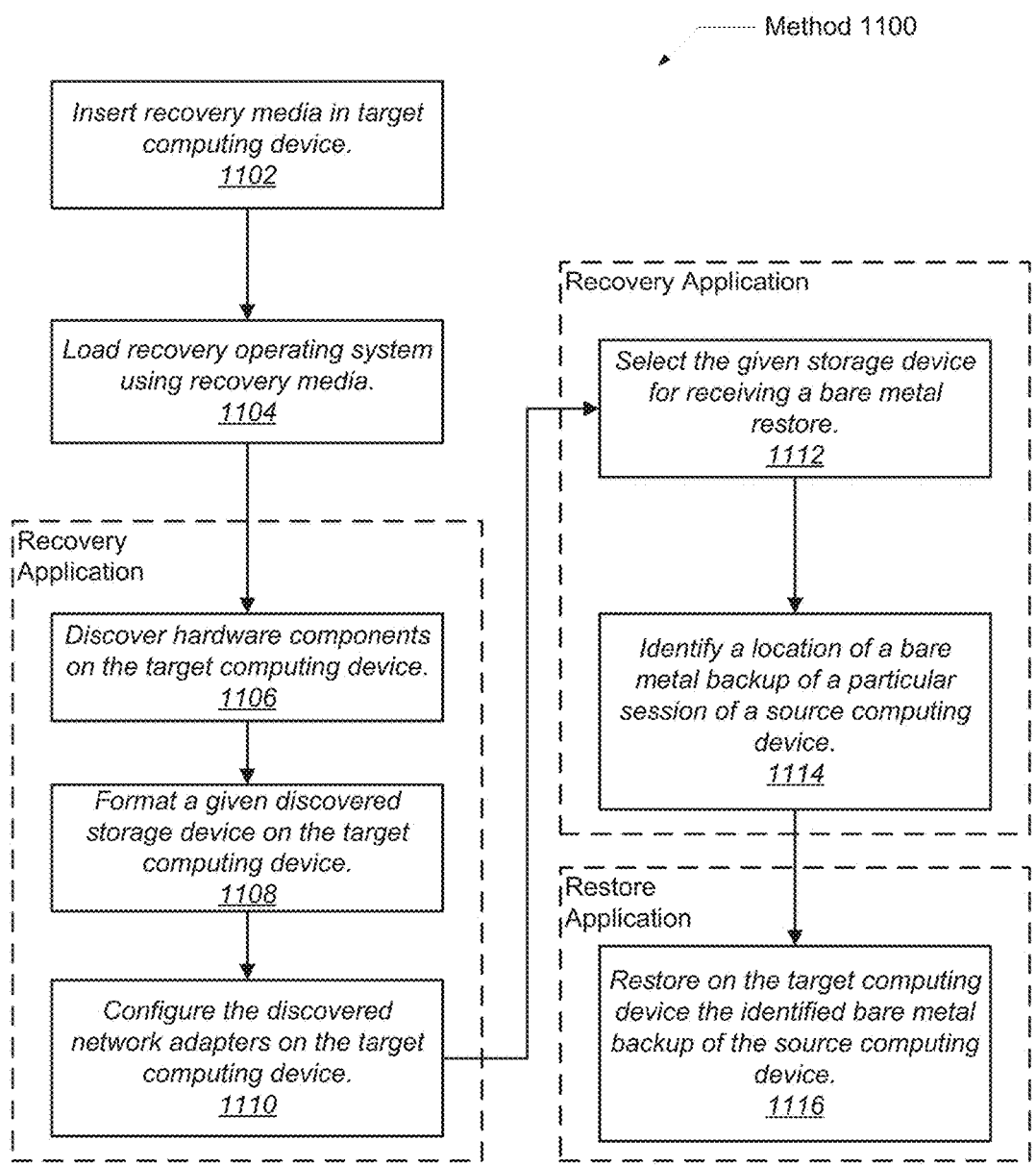
FIG. 10 is a flow diagram illustrating one embodiment of a method for efficiently restoring data to a different computing device.

Referring now to FIG. 10, an embodiment of a method 1100 for efficiently restoring data to a target computing device is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 1102, bare metal recovery media storing recovery program instructions is inserted in a target computing device or otherwise connected to the target computing device in a manner to initiate execution of the recovery program instructions. In various embodiments, the bare metal recovery media is a CD. In other embodiments, the bare metal recovery media is another type of storage device as described earlier. In block 1104, in various embodiments, a user is prompted on a command line whether to begin execution of the recovery program instructions stored on the bare metal recovery media. In other embodiments, the recovery program instructions begin execution automatically soon after being inserted in a corresponding drive connected to the target computing device. The target computing device while executing the recovery program instructions may load a recovery operating system that includes a recovery application.

In block 1106, components corresponding to the hardware configuration of the target computing device are discovered. The components may include the number and the type of processors, the amount and the type of available memory, available bus types and speeds, and I/O ports for I/O devices, such as storage devices. In block 1108, a given discovered storage device is formatted. In various embodiments, the given storage device is a locally connected IDE HDD. However, in other embodiments, the given storage device is a locally connected SSD or an externally connected HDD or SSD. Other types of storage devices are possible and contemplated.

In block 1110, discovered network adapters are configured on the target computing device. In various embodiments, the steps in blocks 1106-1110 are performed by the recovery application loaded by the recovery operating system on the target computing device. Following, in block 1112, the given storage device is selected to receive the information corresponding to a bare metal restore operation. In block 1114, the location of a backup of a particular session or a particular state of a source computing device is identified. For example, the location may be network attached storage. Alternatively, the location is a local but externally connected HDD or SSD. In various embodiments, the steps in blocks 1112-1114 are performed by the target computing device executing the recovery application loaded by the recovery operating system. In block 1116, the bare metal restore operation is performed on the target computing device using the identified backup of the source computing device.

Figure 11:
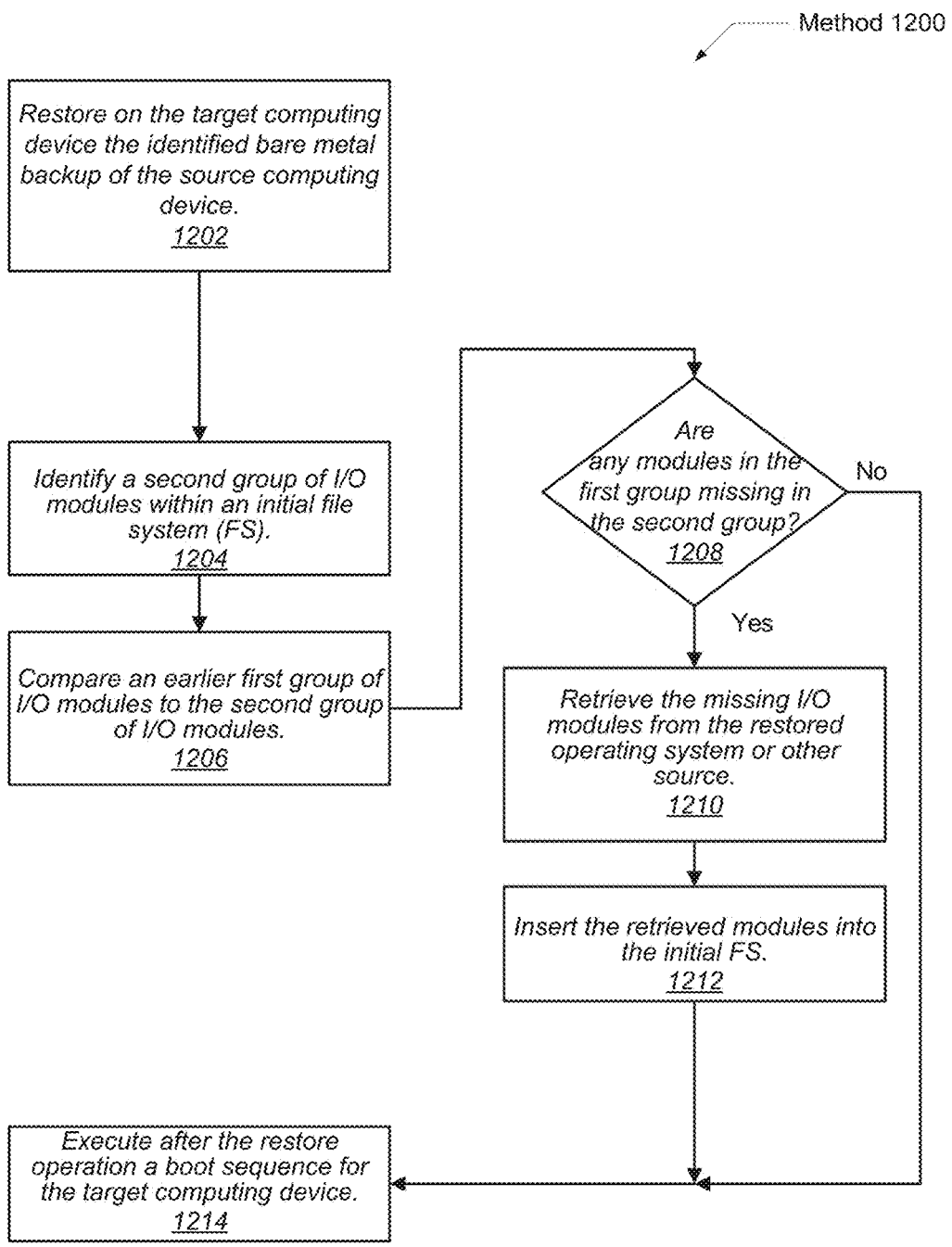
FIG. 11 is a flow diagram illustrating one embodiment of a method for efficiently modifying an initial file system prior to a startup boot of a bare metal computing device using restored information.

Turning now to FIG. 11, an embodiment of a method 1200 for efficiently modifying an initial file system prior to a startup boot of a bare metal computing device using restored information is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 1202, a bare metal restore of at least the OS and the initial FS from an identified location to the given storage device is performed. As described earlier, examples of the initial FS include the initramfs file. The steps described earlier in method 1100 may have already been performed. For example, a first group of input/output (I/O) modules needed for I/O interfaces on a target computing device are identified. The first group may be identified during an early step of a recovery sequence performed during execution of recovery program instructions stored on a recovery media such as a bare metal restore CD. The recovery media may include recovery program instructions for discovering the hardware configuration of the target computing device or initiating firmware on the target computing device to perform the discovery.

As described earlier, the hardware configuration hardware configuration of a computing device includes at least a processor architecture, the input/output (I/O) ports for connected peripheral devices and storage devices, an amount of on-die processor memory and an amount of off-chip memory, power management features and so forth. A given storage device connected to the target computing device is formatted. As described earlier, the given storage device may be a locally connected IDE HDD, but other types of storage devices are possible and contemplated.

A location of a backup of at least an operating system (OS) and an initial file system (FS) configured for the hardware configuration of a source computing device different from the hardware configuration of the target computing device may be identified. The initial FS may be considered configured for the hardware configuration of the source computing device by including at least I/O modules for the device drivers used to access the storage devices connected to the source computing device. In various embodiments, the location of the backup of at least the OS and the initial FS is network attached storage accessed via a configured network adapter.

In block 1204, a second group of I/O modules within the restored initial FS are identified. In various embodiments, the restored initial FS is decompressed prior to identifying the second group of I/O modules. In block 1206, the first group of I/O modules is compared to the second group of I/O modules. If any modules in the first group of I/O modules is missing from the second group of I/O modules (conditional block 1208), then in block 1210, the missing I/O modules are retrieved from the restored OS. In various embodiments, the steps of comparing and retrieving are performed without user intervention. For example, code on the bare metal recovery media may perform these steps without user intervention. In some cases, a simple update message corresponding to the steps may be provided on a splash screen. Alternatively, no message is provided and the steps are performed with no notification to the user. In some embodiments, if an I/O module is not found in the restored OS, a prompt is presented on a splash screen to the user requesting a path identifying a location storing the missing I/O module. The location may be a network connected device, a peripheral connected device, and so forth.

In block 1212, the retrieved I/O modules are inserted into the initial FS. In various embodiments, a copy of the initial FS is created and the copy is modified. In other embodiments, the restored version of the initial FS is modified and no second copy exists. In each case, the tools Dracut or GenKernel are not used to modify the initial FS. Rather, operating system commands in a script stored among the recovery program instructions on the recovery media may be used. Commands for comparing, making directories, copying data and creating module maps and dependency files may be used.

In block 1214, a boot sequence is executed for the target computing device. In various embodiments, the boot sequence follows the steps of method 800 described earlier for method 800 for efficiently booting a computing device using an initial file system. In other embodiments, a similar boot sequence is followed that is aware some steps have already been performed, such as at least the discovery and configuration of hardware components as described for blocks 1106-1110 in the earlier method 1100. If a copy of the initial FS is created, the copy with the retrieved I/O modules is used for the boot sequence. As the initial FS now has the previously missing I/O modules for the target computing device, the initial FS is able to continue the boot process with no user intervention and to mount the real root FS for the target computing device.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a target computing device comprising a first hardware configuration; and
   a memory configured to store a backup image corresponding to a source computing device with a second hardware configuration that is different than the first hardware configuration, wherein the backup image comprises an operating system and first initial file system configured for the second hardware configuration;
   wherein in response to an operation to restore the backup image to the target device, the target computing device is configured to:
      identify at least one input/output (I/O) module needed for the first hardware configuration that is not included in the first initial file system;
      retrieve the at least one I/O module from the operating system in the image;
      insert, without user intervention, the at least one I/O module into the first initial file system to create a second initial file system; and
      execute a startup boot sequence using the second initial file system.

2. The computing system as recited in claim 1, wherein each of the first initial file system and the second initial file system is configured to mount a root file system for said operating system.

3. The computing system as recited in claim 1, wherein prior to restoring the backup image, the target computing device is a bare metal device with no installed operating system.

4. The computing system as recited in claim 1, wherein a hardware configuration comprises at least one or more types of data storage interfaces used for accessing connected storage devices.

5. The computing system as recited in claim 1, wherein to identify the at least one missing I/O module, the target computing device is further configured to:
   identify a first plurality of I/O modules used for accessing storage devices connected to a plurality of data storage interfaces within the target computing device;
   identify a second plurality of I/O modules stored in the first initial file system used for accessing storage devices connected to a plurality of data storage interfaces within the source computing device; and
   compare the first plurality of I/O modules to the second plurality of I/O modules to identify said at least one missing I/O module is in the first plurality of I/O modules and not in the second plurality of I/O modules.

6. The computing system as recited in claim 1, wherein to insert without user intervention the at least one missing I/O module into the first initial file system, the target computing device is further configured without user intervention to:
   retrieve the at least one missing I/O module from the operating system restored on the target computing device; and
   create a copy of the at least one missing I/O module in the first initial file system.

7. The computing system as recited in claim 1, wherein without user intervention the target computing device is further configured to:
   identify dependency files for the at least one missing I/O module;
   retrieve the dependency files from the operating system restored on the target computing device; and
   create a copy of the dependency files in the second initial file system.

8. The computing system as recited in claim 1, wherein to restore the backup image, the target computing device is further configured to:
   format at least a first storage device connected to one of the plurality data storage interfaces; and
   execute via a given one of the plurality of data storage interfaces a backup restore application to restore the operating system and the first initial file system from the memory to the first storage device.

9. A method for executing on a processor, the method comprising:
   storing in a memory a backup image comprising at least an operating system and a first initial file system configured for a first hardware configuration for a source computing device different from a second hardware configuration for a target computing device;
   in response to an operation to restore the backup image to the target device:
      identifying at least one input/output (I/O) module needed for the first hardware configuration that is not included in the first initial file system;
      retrieving the at least one I/O module from the operating system in the image;
      inserting, without user intervention, the at least one I/O module into the first initial file system to create a second initial file system; and
      executing a startup boot sequence using the second initial file system.

10. The method as recited in claim 9, wherein each of the first initial file system and the second initial file system is configured to mount a root file system for said operating system.

11. The method as recited in claim 9, wherein prior to restoring the backup image, the target computing device is a bare metal device with no installed operating system.

12. The method as recited in claim 9, wherein to identify the at least one missing I/O module, the method further comprises:
  identifying a first plurality of I/O modules used for accessing storage devices connected to a plurality of data storage interfaces within the target computing device;
  identifying a second plurality of I/O modules stored in the first initial file system used for accessing storage devices connected to a plurality of data storage interfaces within the source computing device; and
  comparing the first plurality of I/O modules to the second plurality of I/O modules to identify said at least one missing I/O module is in the first plurality of I/O modules and not in the second plurality of I/O modules.

13. The method as recited in claim 12, further comprising removing from the second initial file system one or more I/O modules not required by the target computing device.

14. The method as recited in claim 9, wherein to insert without user intervention the at least one missing I/O module into the first initial file system, the method without user intervention further comprises:
  retrieving the at least one missing I/O module from the operating system restored on the target computing device; and
  creating a copy of the at least one missing I/O module in the first initial file system.

15. The method as recited in claim 9, wherein without user intervention the method further comprises:
  identifying dependency files for the at least one missing I/O module;
  retrieving the dependency files from the operating system restored on the target computing device; and
  creating a copy of the dependency files in the second initial file system.

16. The method as recited in claim 9, wherein each of the source computing device and the target computing device is one of a desktop computer, a laptop, and a server.

17. A non-transitory computer readable storage medium storing program instructions executable by a processor to:
  store in a memory a backup image comprising at least an operating system and a first initial file system configured for a first hardware configuration for a source computing device different from a second hardware configuration for a target computing device;
  in response to an operation to restore the backup image to the target device:
    identify at least one input/output (I/O) module needed for the first hardware configuration that is not included in the first initial file system;
    retrieve the at least one I/O module from the operating system in the image;
    insert, without user intervention, the at least one I/O module into the first initial file system to create a second initial file system; and
  executing a startup boot sequence using the second initial file system.

18. The non-transitory computer readable storage medium as recited in claim 17, wherein to identify the at least one missing I/O module, the program instructions are further executable to:
  identify a first plurality of I/O modules used for accessing storage devices connected to a plurality of data storage interfaces within the target computing device;
  identify a second plurality of I/O modules stored in the first initial file system used for accessing storage devices connected to a plurality of data storage interfaces within the source computing device; and
  compare the first plurality of I/O modules to the second plurality of I/O modules to identify said at least one missing I/O module is in the first plurality of I/O modules and not in the second plurality of I/O modules.

19. The non-transitory computer readable storage medium as recited in claim 17, wherein to insert without user intervention the at least one missing I/O module into the first initial file system, the program instructions are further executable to:
  retrieve the at least one missing I/O module from the operating system restored on the target computing device; and
  create a copy of the at least one missing I/O module in the first initial file system.

20. The non-transitory computer readable storage medium as recited in claim 17, wherein the program instructions are further executable to:
  identify dependency files for the at least one missing I/O module;
  retrieve the dependency files from the operating system restored on the target computing device; and
  create a copy of the dependency files in the second initial file system.

* * * * *